United States Patent [19]

Hunnicutt

[11] 3,805,396
[45] Apr. 23, 1974

[54] VEHICLE FRAME CHECKING APPARATUS

[75] Inventor: Wayne E. Hunnicutt, Big Bend, Wis.

[73] Assignee: Applied Power Industries, Inc., Milwaukee, Wis.

[22] Filed: July 20, 1972

[21] Appl. No.: 273,599

[52] U.S. Cl........ 33/180 AT, 33/174 G, 33/181 AT
[51] Int. Cl.......................... G01b 3/38, G01b 5/14
[58] Field of Search ....... 33/174 G, 180 AT, 174 R, 33/181 AT

[56] References Cited
UNITED STATES PATENTS

| | | | |
|---|---|---|---|
| 2,853,794 | 9/1958 | Van Winkle | 33/180 AT X |
| 3,210,857 | 10/1965 | Lill | 33/180 AT |
| 2,798,296 | 7/1957 | Liskey | 33/288 |
| 3,330,043 | 7/1967 | Sonner | 33/174 G |
| 3,305,936 | 2/1967 | Dent | 33/180 AT X |

Primary Examiner—John W. Huckert
Assistant Examiner—Milton Gerstein

[57] ABSTRACT

An apparatus for checking the alignment of a vehicle frame including a portable horizontal frame having a plurality of pockets or tubular members for receiving a respective gauging element therein. Each of the pockets are mounted as pairs on opposite sides of the framework and additional pockets are provided on lateral members and the ends of the frame. The plurality of gauging elements may assume a variety of designs depending on the particular vehicle being checked. The gauging elements are utilized not only to establish proper orientation of the horizontal frame with respect to the vehicle frame but to indicate automatically the degree of misalignment thereof. The respective gauging elements are retained within the pockets by either a pair or removable pins which effect removable secure retention of the gauge therein, by a single lower removable pin which permits pivotal movement of the gauge relative to the pocket or by free floating positioning within a pocket.

10 Claims, 7 Drawing Figures

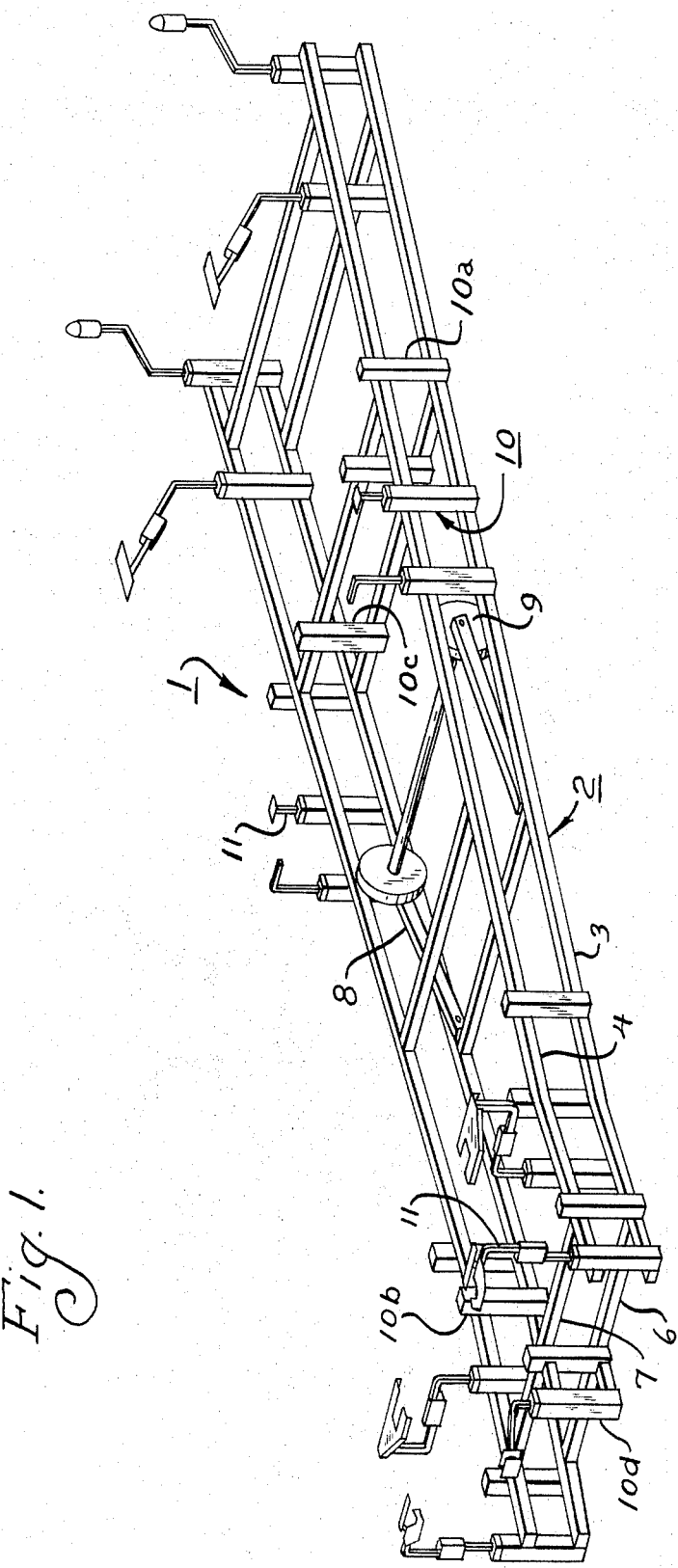

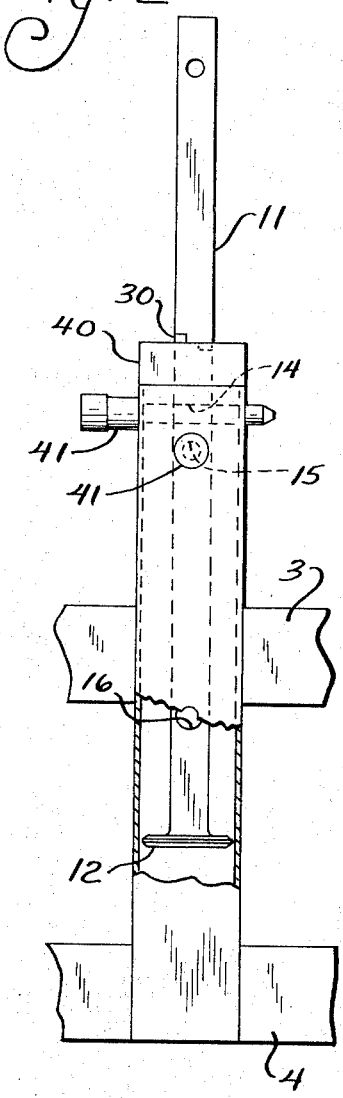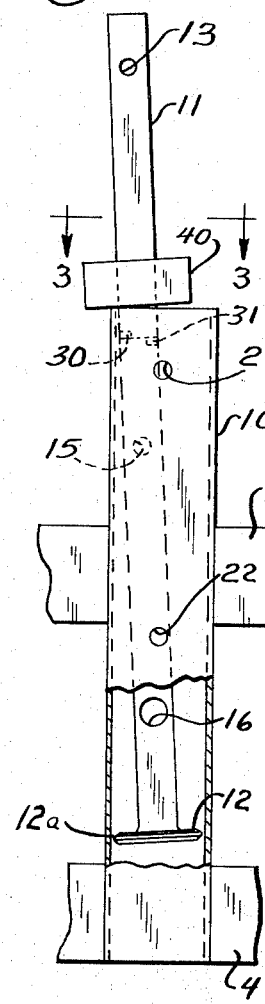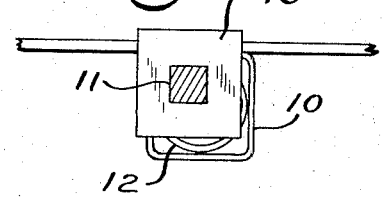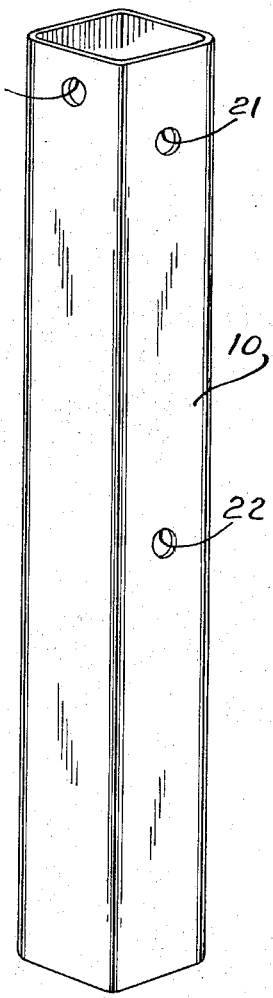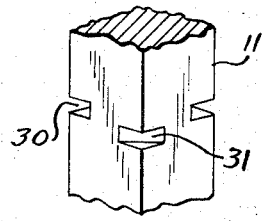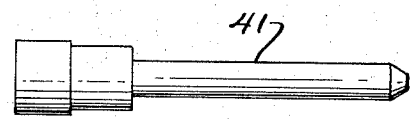

VEHICLE FRAME CHECKING APPARATUS

BACKGROUND OF THE INVENTION

This invention relates in general to gauging systems and, in particular, to an improved apparatus for checking the alignment of vehicle frames.

More specifically, the invention relates to an apparatus for checking a vehicle frame for an indication of the degree of misalignment and distress of alignment of a vehicle frame wherein a horizontal framework includes respective pairs of pockets on opposite sides of the frame and lateral sides thereof for receiving a selective gauging element. At least two gauging elements are rigidly secured to the pocket and contact the vehicle to establish correct orientation of the horizontal frame with reference to the body of a vehicle being gauged. Other gauging elements pivotally or freely supported in other pockets visually indicate the degree of misalignment by their orientation in a respective pocket when a portion of the element contacts or is attached to the vehicle frame.

During the repair of damaged vehicles, it is desirable to insure that the frame of the vehicle is accurately aligned in comparison to its original dimensions and configuration. As a result of a collision, it is possible that a vehicle absorbs a variety of damage such as misalignment of the frame in both horizontal and vertical directions whereby the frame lies at improper heights along its length or is non-symmetrical and the like.

Although it is possible that detection by visual inspection of the frame of misalignment of a vehicle after a collision is possible, the understructure and frame may have suffered considerable damage which cannot be detected without the use of indicating instruments. In the prior art, several gauges and systems have been employed for the purpose of aiding in the repair of damaged vehicle frames. However, the prior art techniques of gauging misalignment have not been sufficiently accurate and are inefficient in quickly and accurately determining the degree of distortion of the frame.

Some prior art frame checking devices have utilized hanging-type structure which is attached to the underside of the frame wherein the operator visually determines the degree of misalignment. SUch a technique of gauging misalignment is insufficiently accurate for realigning a vehicle frame particularly when realignment within accurate tolerances is desired. In past techniques, other frame checking systems have attempted to achieve greater accuracy by employing gauges with a complex design which have been found to be uneconomical to manufacture and use and inconvenient to operate. Moreover, the latter complex type indicators also do not achieve an optimum degree of accuracy and versatility. Therefore, it is desirable to provide a frame checking device which achieves greater accuracy in indicating the degree of misalignment of a vehicle frame and which at the same time is inexpensive to manufacture and achieves an ease of use not heretofore provided by the prior art.

SUMMARY OF THE INVENTION

It is, therefore, an object of this invention to improve the gauging of vehicle frames.

Another object of this invention is to increase the accuracy of the gauging of the degree of misalignment of a vehicle frame.

A further object of this invention is to reduce the complexity and cost of a frame checking device.

Still another object of this invention is to check the alignment of frames by means of a plurality of gauging elements.

A still further object of this invention is to increase the ease and rapidity at with which a frame is checked.

These and other objects are attained in accordance with the present invention wherein there is provided an improved frame checking device for determining the degree of misalignment and depression of a vehicle frame. The frame checking apparatus of the invention includes a portable horizontal framework which supports a plurality of pockets means arranged in pairs on opposite sides of the framework and with additional pockets on lateral sides and the ends thereof. The framework is adapted to be positioned underneath the vehicle frame being checked wherein the pockets respectfully receive an appliance or gauging element which is adapted to contact or be attached to the vehicle and be inserted if possible into the pockets. Some of the appliances are utilized to align the horizontal framework with respect to the vehicle frame for proper orientation for gauging purposes and other appliances automatically indicate the degree of misalignment of vehicle frame. The apparatus of the invention achieves accurate determination of the degree of misalignment of a vehicle frame with a minimum of complexity and operative steps. The apparatus herein disclosed may be readily positioned under a vehicle and the degree of misalignment of the vehicle frame quickly determined.

BRIEF DESCRIPTION OF THE DRAWINGS

Further objects of this invention, together with additional features contributing thereto and advantages accruing therefrom, will be apparent from the following description of an embodiment of the invention when read in conjunction with the accompanying drawings, wherein:

FIG. 1 is a side perspective illustration of a frame checking apparatus of the invention;

FIG. 2 is an enlarged partial schematic side illustration of a pocket device having an appliance or attachment in locked position in the frame checking apparatus of FIG. 1;

FIG. 3 is a side schematic illustration of a pocket device having an appliance or attachment in a floating condition in the frame checking apparatus of FIG. 1;

FIG. 4 is a top schematic illustration taken along line 3—3 of FIG. 3;

FIG. 5 is an enlarged partial perspective illustration of the indicating notches of an appliance of the frame checking device of FIG. 1;

FIG. 6 is a side schematic illustration of a retaining pin of the frame checking apparatus of FIG. 1;

FIG. 7 is a perspective illustration of a pocket for use in the frame checking apparatus of FIG. 1.

DESCRIPTION OF THE PREFERRED EMBODIMENT

Referring now to FIG. 1 there is illustrated an embodiment of the vehicle frame checking apparatus of the invention. Frame checking apparatus 1 includes a horizontally disposed and rigid frame 2 formed by a plurality of pairs of upper and lower longitudinal side members 3 and 4 and a plurality of interconnected upper and lower cross members 6 and 7 located at several locations along the length of the frame. Alternatively, the frame may include single side and lateral members, if desired. The side and lateral members are formed of any suitable material such as a metal and are interconnected by a conventional attachment technique. Pivotally connected to the bottom of opposite side members 2 is a wheel supporting frame 8 which is shown in an upper non-operative position in FIG. 1. Wheel support 8 rotatably supports wheels 9 which can be lowered to allow the frame to be rolled to a selected position for operation. A locking mechanism (not shown) may be used in conjunction with the wheel support to maintain the wheel in a down position to permit rolling of frame 2.

A plurality of tubular or pocket members 10 are coupled to frame 2 at various locations thereon. Tubular members 10 are constructed of a suitable material such as metal and are attached to the frame by conventional techniques such as welding and the like. Tubular members 10 includes a plurality of tubes 10a which are affixed as corresponding pairs to the outside of side members 3 and 4 on opposite sides of frame 2. The corresponding pairs of tubes 10a are aligned in a plane perpendicular to the longitudinal axis of frame 2. In addition, tubes 10b are attached in similar corresponding pairs to the inner sides of longitudinal side members 3 and 4 and tubes 10c are attached to a side of selected lateral members 6 and 7. A single tube 10d is also provided on at least one end of frame 2 on an end lateral member.

Tubular members 10 including tubes 10a, 10b, 10c, and 10d are utilized to support various gauging elements or attachments 11 which gauge or check the alignment of a vehicle frame in a manner to be described in detail later. The particular attachments shown in FIG. 1 are only shown for purposes of illustrating the invention and a variety of attachments may be utilized in conjunction with the invention depending on the model of vehicle being checked, the location of the particular pocket or tube 10 in relation to the frame, the technique relied upon in checking the frame being gauged by the apparatus of the invention or numerous other factors and conditions. In general, attachment 11 is intended to be attached to or contact a certain selected portion of the vehicle frame.

Referring now to FIGS. 2 to 7, the construction of pockets 10 and their retention of attachments 11 is best shown. As is clearly illustrated in FIG. 7, pockets 10 are in the form of a hollow member capable of receiving and supporting a single attachment 11 as shown in FIGS. 2 and 3. The particular attachment 11 shown in FIGS. 2 and 3 is shown only for illustrative purposes of how a typical attachment is supported within the pocket 10. As indicated previously, gauging elements 11 can assume a variety of other forms as exemplified in FIG. 1 or other designs. However, the lower portion of the numerous attachments used in the invention generally are constructed with a similar insertion and retention design as attachment 11 illustrated in FIGS. 2 and 3.

Attachment 11 is an elongated member having a substantially square cross sectional area or other suitable configuration and which includes at its lower end an affixed disc element 12 having a periphery 12a which restricts the lateral movement of the lower end of attachment 11 within the tubular member. A hole 13 passes through attachment 11 at its upper end to permit the affixing of a gauging element (not shown) to contact or be in attachment to a vehicle frame at a selected location. Alternatively, the gauging portion may be integrally formed as the upper portion of attachment 11 wherein the lower portion would be similarly positionable within tube 10 as illustrated in FIGS. 2 and 3. A pair of holes 14 and 15 extend through attachment 11 near the mid-portion thereof wherein hole 14 is positioned slightly above hole 15 and the longitudinal axis of the holes are perpendicular to each other. A lower hole 16 passes through attachment 11 at a location above disc 12 and extends in the same direction as hole 15.

Referring in particular to FIGS. 2, 3 and 7 corresponding holes are provided in pocket or tubular member 10 for reasons to be explained in detail later. As shown in FIG. 7, an upper hole 20 passes through one side of tube 10 and through the opposite side thereof (not shown) in alignment therewith. Similarly, a hole 21 positioned slightly below hole 20 passes through opposite sides of tube 10 wherein a horizontal axis passing through holes 20 and 21 lie in perpendicular directions to each other. A lower hole 22 passes through opposite sides of tube 10 and the longitudinal axis of hole 22 extends in same direction as hole 21.

Referring now to FIGS. 2 and 5 there is illustrated the provision of an indicating means positioned in the approximate mid-portion of attachments 11. Attachments 11 include a first pair of upper indicating notches 30 on opposite corners and a second pair of lower notches 31 provided on the other corners. Generally, notches 30 and 31 are separated by a selected reference distance such as 2mm. or other suitable space.

Referring to FIGS. 2 to 4 a second indicating means in the form of block member 40 in sliding relation to attachment 11 rests on top of each pocket 10. Upper notch 30 is selected to be at a position on the attachment such that when notch 30 aligns with the upper surface of block 40 resting on the top of pocket 10, holes 20, 21 and 22 of pocket 10 will align respectively with holes 14, 15 and 16 of attachment member 11. When it is desired that attachment 11 be firmly locked in tubular member 10, a pair of removable elongated pins 41 are inserted in holes 20 and 14 and holes 21 and 15, respectively, as shown in FIGS. 2 and 6.

However, under certain circumstances it is desirable that attachment 11 be secured in a vertical direction within the pockets but still be laterally or pivotally movable therein. In such a case, upper pins are not present in upper holes 14 and 15 but a single pin (not shown) is inserted in lower holes 22 and 16. A third floating condition of the attachment within pocket 10 is shown in FIG. 3 wherein no pins are present and the attachment is free to move pivotally or laterally within the pocket as well as possess freedom of vertical movement. The particular selection of one of the above retaining techniques of the attachment within the pocket will be apparent from the following description of the operation and use of the frame checking apparatus of the invention.

In operation of the frame checking apparatus, pockets 10 are first rigged with a proper set of attachments for the vehicle to be checked. Generally, the attachments are not secured by pins 41 and are merely resting within the plurality of pockets. By use of wheel 9, frame 2 is rolled under a vehicle (not shown) which generally is positioned on safety stands of normal height. After positioning the frame of the invention at a proper position, two attachments 11 of suitable design are attached to the vehicle in an undamaged area near one end thereof and at least one third attachment 11 fastens to the vehicle at an opposite end.

The first two attachments 11 are then locked into place by the insertion of two locking pins 40 in the pair of holes provided at the top of the vertical pockets. After securement of the first two attachments at a proper location on the vehicle, the third attachment is then secured at the lower end by an insertion of a single pin 41 permitting misalignment to exist in vehicle frame without inducing a load on the apparatus. Since the top of all the tubular members establish a roughly horizontal datum plane, the attachment of the first two attachments to both the apparatus of the invention and the vehicle, and the securing of the third attachment establishes a proper checking orientation of the apparatus with respect to the vehicle frame.

Subsequent to the attachment of the first two lock attachments to the pocket in an undamaged area and the provision of a third attachment at the opposite end of the vehicle frame, selected additional attachments are now secured to the vehicle at a selected position thereon as desired and will visually indicate the misalignment (or alignment) by the relative position of notches 30 on the attachment relative to the block or by the position of the block resting on the vertical pockets.

For example, if the vehicle frame is aligned in an in or out direction at the location of a particular attachment, block 40 will be flush and aligned with a tubular member similar as illustrated in FIG. 1. On the other hand, if the vehicle frame is misaligned in an in or out direction, the block will be displaced from a flush or aligned position with the tubular member as similarly shown in FIG. 3 and thus visually permits a determination of the amount of in or out misalignment. Vertical misalignment is indicated by the amount that notch 30 is out of alignment with top of block 40. After noting the amount of misalignment, the vehicle frame can be realigned by applying proper corrective forces thereto. The number of attachments utilized to indicate misalignment may depend on the particular vehicle and the amount of damage it suffered. Although the operation of the apparatus is described with respect to attachments which are secured to the vehicle frame, it is also apparent that the invention may utilize attachments or gauging elements which merely contact the vehicle frame, if convenient.

While the invention has been described with reference to the preferred embodiment, it will be understood by those skilled in the art that various changes may be made and equivalents may be substituted for elements thereof without departing from the true spirit and scope of the invention. In addition, many modifications may be made to adapt a particular situation and material to the teachings of the invention without departing from its essential teaching.

What is claimed is:

1. A vehicle frame checking apparatus for indicating the degree of misalignment of a vehicle frame comprising frame means adapted to be positioned beneath a vehicle frame to be checked,
a plurality of selectively positioned tubular members attached to the frame means,
gauging members adapted to be coupled to the tubular members
said selectively positioned tubular members arranged for predetermined alignment with said gauging members when connected to predetermined locations on the vehicle frame being checked,
an indicating member connected to each of the plurality of gauging members and adapted to be positioned exteriorly of a respective tubular member to visually indicate the degree of misalignment of the vehicle frame by the position of the indicating member relative to the tubular member.

2. The frame checking apparatus of claim 1 wherein one end of the gauging member is adapted to extend at least partially into the tubular member.

3. The frame checking apparatus of claim 2 further including retention means for selectively retaining an gauging element within a tubular member.

4. The frame checking apparatus of claim 3 wherein the retention means selectively retains an gauging element against vertical movement relative to the tubular member.

5. The frame checking apparatus of claim 4 wherein the retention means supports the gauging element substantially rigidly within the tubular member.

6. The frame checking apparatus of claim 5 wherein the retention means includes at least one elongated pin member for insertion in complimentary holes provided through the tubular member and the gauging element.

7. The frame checking apparatus of claim 2 wherein the lower end portion of an gauging member possesses a substantially smaller cross sectional area than interior cross sectional area of a tubular member.

8. The frame checking apparatus of claim 7 wherein the lower end of the gauging elements includes an enlarged peripheral surface to restrain lateral movement of the attachment within respective tubular members.

9. The frame checking apparatus of claim 1 wherein the indicating member is a block adapted to rest on the top of the tubular member.

10. The frame checking apparatus of claim 9 further including indicia means positioned on the gauging member for indicating predetermined relative positioning of a respective gauging member in a tubular member.

* * * * *